(12) United States Patent
Kim et al.

(10) Patent No.: US 7,613,424 B2
(45) Date of Patent: Nov. 3, 2009

(54) METHOD FOR PERFORMING BLUETOOTH HIGH RATE SUPERVISOR HANDOVER

(75) Inventors: Yong-suk Kim, Daejeon (KR); Bin Zhen, Suwon (KR); Arun Naniyat, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1042 days.

(21) Appl. No.: 10/778,214

(22) Filed: Feb. 17, 2004

(65) Prior Publication Data

US 2004/0198358 A1 Oct. 7, 2004

(30) Foreign Application Priority Data

Apr. 1, 2003 (KR) .................. 10-2003-0020427

(51) Int. Cl.
*H04B 7/00* (2006.01)
*H04W 36/00* (2009.01)
(52) U.S. Cl. ............... 455/41.2; 455/436; 455/517; 370/311
(58) Field of Classification Search ............ 455/41.2, 455/41.3, 517, 518, 519, 436; 370/331; 709/223; 375/132
See application file for complete search history.

(56) References Cited

U.S. PATENT DOCUMENTS 6,026,303 A 2/2000 Minamisawa 7,222,166 B2* 5/2007 Treister et al. .............. 709/223
2002/0098841 A1 7/2002 Treister

FOREIGN PATENT DOCUMENTS

| EP | 1 176 762 A1 | 1/2002 |
|---|---|---|
| GB | 2 379 358 A | 3/2003 |
| WO | 99/11081 A2 | 3/1999 |
| WO | 01/03379 A1 | 1/2001 |

OTHER PUBLICATIONS

W. L. Davis, "A MAC Layer submission for the high Rate 802.15.3 Standard", Project: IEEE P802.15 Working Group for Wireless Personal Area Networks (WPANS), pp. 1-39, Sep. 2000.

* cited by examiner

*Primary Examiner*—Quochien B Vuong
(74) *Attorney, Agent, or Firm*—Sughrue Mion, PLLC

(57) ABSTRACT

Disclosed is a method of performing a supervisor handover with ease prior to the supervisor handover by selecting a candidate supervisor on a Bluetooth High Rate (HR) subnet having one supervisor and a plurality of members. The method comprises the steps of selecting the candidate supervisor eligible for the new supervisor among the members on the HR subnet prior to the supervisor handover, and broadcasting an inquiry message to all the members on the HR subnet by the candidate supervisor when the supervisor handover is initiated. The method further comprises the step of electing the candidate supervisor as the new supervisor when all members on the HR subnet respond to the inquiry message.

5 Claims, 3 Drawing Sheets

METHOD FOR PERFORMING BLUETOOTH HIGH RATE SUPERVISOR HANDOVER

CROSS-REFERENCE TO RELATED APPLICATIONS

This application claims the priority of Korean Patent Application No. 2003-20427, filed Apr. 1, 2003 in the Korean Intellectual Property Office, the disclosure of which is incorporated herein by reference.

BACKGROUND

1. Field of the Invention

The present invention relates to a supervisor handover on a Bluetooth high rate subnet, and in particular to a method capable of reducing supervisor handover time by using information on each member of a Bluetooth high rate subnet supervisor and selecting a candidate supervisor prior to a supervisor handover, and therefore effectively performing the supervisor handover.

2. Description of the Related Art

Bluetooth is a short-range wireless communication technology intended to replace a complicated cable connection among devices with a wireless connection among Bluetooth-enabled digital devices such as a printer, a personal digital assistant (PDA), a desktop, a facsimile, and a keyboard. A basic unit of the Bluetooth networking is a piconet comprising the Bluetooth enabled devices of a master to initiate data transaction and slaves to respond to the master in the Bluetooth network. Up to seven active slaves can be set to communicate with one master. Also, either the master or the slave of one piconet can be designated as a master for another piconet. Multiple piconets with overlapping coverage areas form a scatternet.

The Bluetooth technology provides a relatively fast transfer speed with low power consumption. In practice, for the devices within 10 m distances, 1 Mb/s transfer speed is enough to transfer and receive data. However, as the transfer of a large-capacity data such as a voice data or an image data is recently increasing, the transfer speed is required to be faster.

Accordingly, respective Bluetooth Special Interest Group (SIG) WGs (Working Groups) are working on a Bluetooth high data rate specification which is extended from the established Bluetooth specification. Hereinafter, the established Bluetooth version 1.1 is referred to as a "Low Rate (LR) mode" or a "Frequency Hopping (FH) mode", and the high data rate specification is referred to as a "High Rate (HR) mode". With the HR mode, the data transfer speed is estimated to be improved up to 12 Mb/s.

A HR channel for the HR mode may be formed with the conventional Bluetooth FH piconet channel. Accordingly, a HR subnet network is configured as a subnet of a FH piconet. At the same time, devices in the FH piconet can configure the HR subnet within the Bluetooth FH piconet by configuring the HR channel.

FIG. 1 is a diagram depicting an example of the FH piconet. Referring to FIG. 1, FH piconet is comprised of a master M and slaves S1~S7. The master M and the slaves S1, S2 comprise one HR subnet, and the slaves S3, S4, S5 comprise another HR subnet. In the FH piconet, more than two HR subnets can be configured. The devices in the same HR subnet can directly communicate with each other on the HR channel.

The master of the FH piconet does not have to be included in the HR subnet, but is only concerned in configuration of the HR subnet. Instead, the HR subnet includes a HR supervisor.

Referring to FIG. 1, on the HR subnet comprised of the master M and the slaves S1, S2, the master M is the supervisor. On the HR subnet comprised of the slaves S3, S4, S5, the slave S4 is the supervisor. When the HR subnet includes the master M, the master M usually functions as the HR supervisor.

Different from the master M, the HR supervisor does not regulate traffic in real time. The supervisor is responsible for link management. In detail, the supervisor enhances a transaction between the FH mode and the HR mode, reports a configuration change of the HR network such as a joining of a new device, and maintains a list of active devices in the HR subnet.

The devices in the HR subnet (hereinafter, called "HR members") still hold their function in the FH piconet. The piconet master recognizes the slaves in the HR subnet as having a power-saving mode such as a Park mode, Hold mode, and Sniff mode. The devices in the HR subnet communicate on the HR channel while not communicating on the FH channel, and periodically scan the FH piconet channel in order to synchronize with the FH channel. Accordingly, the piconet master continuously controls all of the devices in the FH piconet.

In the communication on the HR channel, Medium Access Control (MAC) is performed via a token mechanism. The token mechanism is a priority scheme which provides the right to transmit on the HR channel by allowing a priority slot, or a token, to one of the members of the HR subnet; the token mechanism is introduced to guarantee a Quality of Service (QoS), and to provide transmission services such as synchronous, asynchronous and isochronous transmission service.

The HR devices use the token mechanism and communicate in a peer-to-peer basis without any intervention of the HR supervisor. However, the HR supervisor has to hold addresses of active members constantly, and when the supervisor is changed, the previous supervisor returns to the original state as a member of the FH piconet.

Even if there is no HR supervisor, the communication on the HR network is possible in this case, but the priority slot cannot be allocated to any device. As a result, in any slot regardless of the priority, the traffic can be initiated. It is not possible to add a new device or a new logic link to the network, because the slot structure of the network is lost. Accordingly, the FH master periodically broadcasts information about the current HR supervisor to every member of the HR subnet and transmits a poll message to the HR supervisor. If the supervisor does not respond within a timeout period, the FH master detects an absence of the supervisor.

Any device in the HR network can be the HR supervisor, and the HR supervisor is selected by the FH master. If the absence of the HR supervisor is detected, the FH master selects a device having a smallest Device Control Point (DCP) address as a new HR supervisor among the members which are capable of communicating with the other entire members. The DCP address is allocated by the FH master in an ascending order from "1", when each device is connected to the HR network. A procedure of selecting the new supervisor due to the absence of the current supervisor is referred to as a HR supervisor handover and can be caused by several reasons such as the HR network disconnection of the current supervisor (HR synchronization timeout) or a request for Link Message Protocol (LMP) HR handover due to the joining of a new device having a better capability for the supervisor. Since every member in the HR network holds information on the configuration of the HR network, any member can be the supervisor.

According to the conventional method as aforementioned, upon the absence of the current HR supervisor, the master M retrieves the members of the HR subnet capable of communicating with the other members and selects the new supervisor among them. At this time, the master notifies the member having the smallest DCP address of the supervisor handover, and the notified member broadcasts an inquiry message to the other members. Based on responses from the members, it is determined whether the notified member is capable of communicating with the other members. If there is no response from any member, the notified member is not qualified for the supervisor. Then, the master notifies the member having the second smallest DCP address of the supervisor handover, and the notified member repeats the above procedure. This procedure is repeated over again until all of the members respond to the inquiry message or the inquiry message is broadcasted by all of the members. Accordingly, if there is no member capable of communicating with all of the members, the supervisor handover is finished and all of the HR members return to the FH piconet.

The DCP address indicates only the order of connection to the FH network of the devices, not the device capability or the location on the HR network. That is, the device having the smallest DCP address does not always have to be the best candidate for the supervisor. Therefore, in the supervisor handover, generally, the above procedure is repeated several times until the master selects the new supervisor. After the new supervisor is selected, a synchronization is newly performed by the new supervisor and the HR network is stabilized. Consequently, a long absent period of the supervisor raises problems such as service interruption.

SUMMARY

The present invention has been devised in view of the above problem, and an aspect of the present invention is to provide a supervisor handover method capable of reducing a supervisor handover time by selecting a candidate supervisor prior to the supervisor handover by using member information which a supervisor on a Bluetooth High Rate (HR) subnet obtains.

To accomplish the above aspect, the supervisor handover method for electing a new supervisor on a first HR subnet of a Frequency Hopping (FH) piconet, including one supervisor and a plurality of members comprises the steps of selecting the candidate supervisor eligible for the new supervisor among the members on the first HR subnet prior to the supervisor handover, broadcasting an inquiry message to the entire member on the first HR subnet by the candidate supervisor when the supervisor handover is initiated, and electing the candidate supervisor as the new supervisor if all of the members on the first HR subnet respond to the inquiry message.

The step of electing the new supervisor comprises the steps of transmitting a seek message to the responding members in order to ask to seek a missing HR member, that is, a HR member which does not respond to the inquiry message and to configure a second HR subnet if there is a missing member on the first HR subnet, receiving the seek message, seeking the missing member, as a supervisor, and configuring the second HR subnet including the missing member, and transmitting a response message for the seek message from the supervisor of the second HR subnet to the candidate supervisor.

When a predetermined timeout elapses, the supervisor handover is finished and the member not included in any HR subnet returns to an original state as a member of the FH piconet.

The step of selecting the candidate supervisor comprises the steps of transmitting a device capability record and a device neighbor record from each member on the first HR subnet to the supervisor, selecting the candidate supervisor by the supervisor based on lists of the device capacity and the device neighbor of all the member on the first HR subnet, and broadcasting the lists and the selected candidate supervisor to all the members on the first HR subnet.

The device capability record includes at least one of a battery available power capacity and support functions on the HR subnet of a certain member, and the device neighbor record of a certain member includes other members within a radio range of the member.

BRIEF DESCRIPTION OF THE DRAWINGS

The above aspect, and other features and advantages of the present invention will become more apparent after a reading of the following detailed description when taken in conjunction with the drawings, in which.

DETAILED DESCRIPTION OF THE PREFERRED EMBODIMENT

Hereinafter, referring to accompanying drawings, the present invention is described in great detail.

Figure 1:
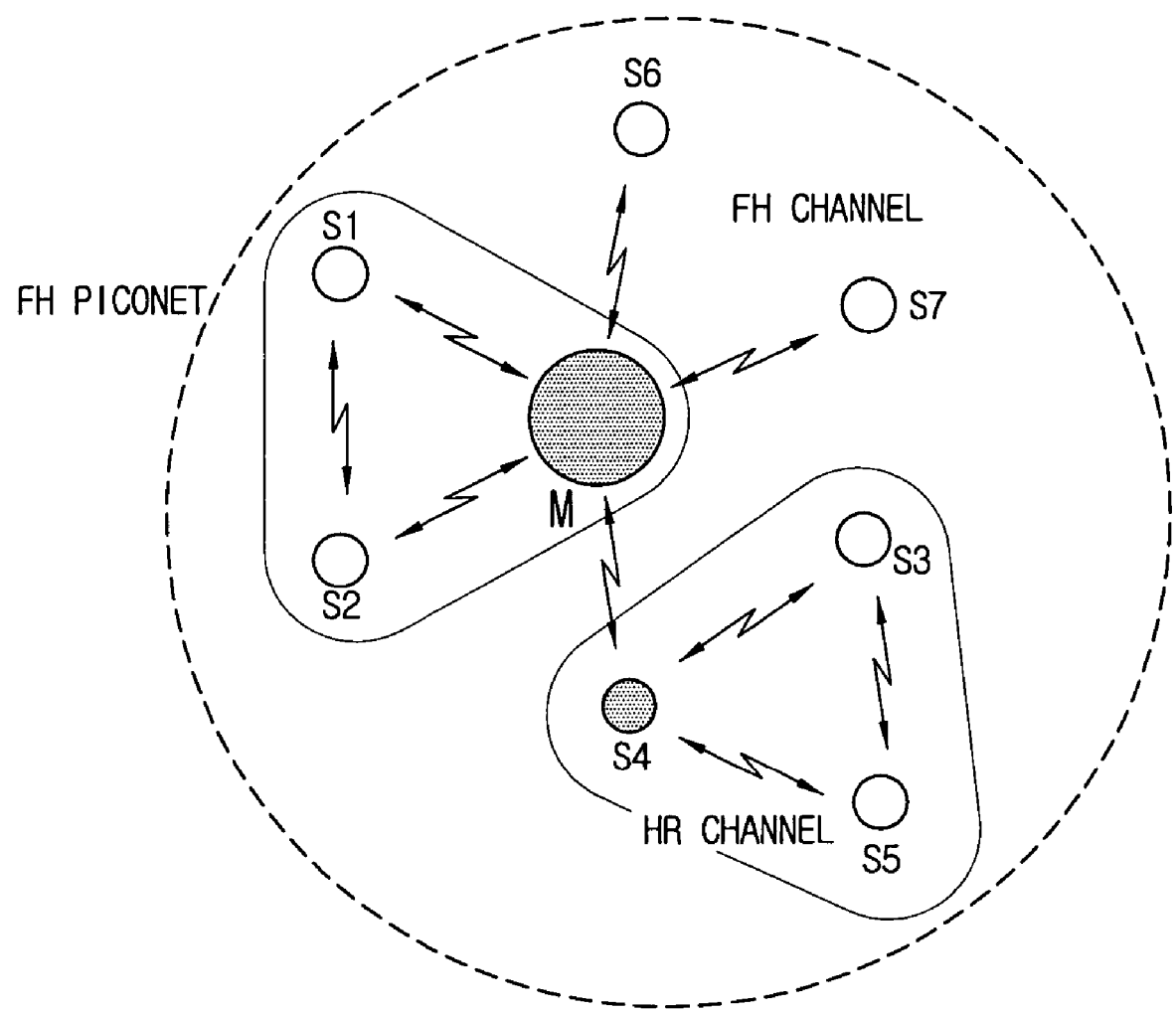
FIG. 1 is a diagram depicting an example of a Bluetooth Frequency Hopping piconet.
Figure 2:
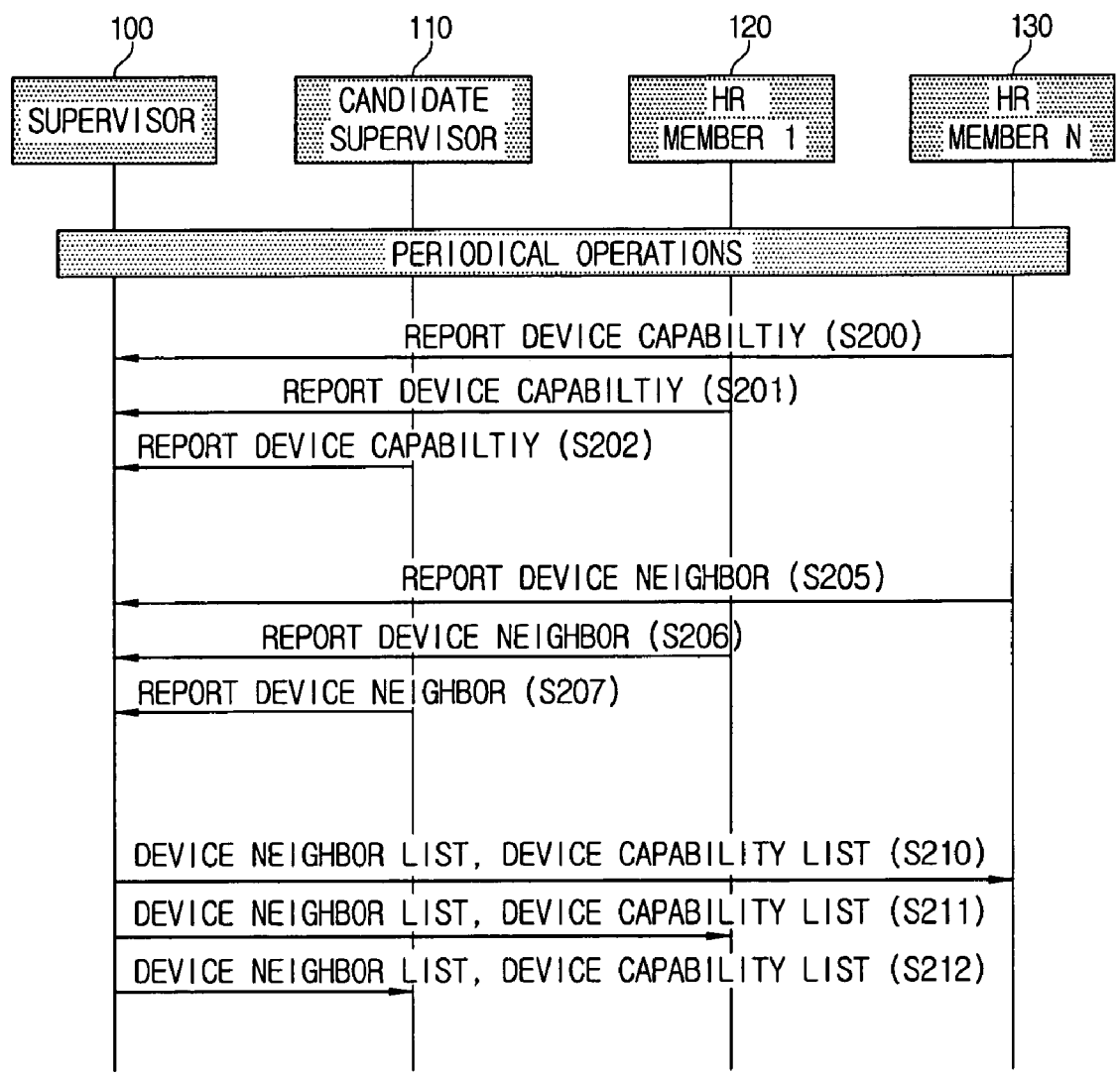
FIG. 2 is a message sequence chart depicting an operation of each member in a High Rate (HR) subnet prior to a HR supervisor handover according to the present invention.

FIG. 2 is a message sequence chart (MSC) of an operation of each member in a High Rate (HR) subnet prior to a HR supervisor handover.

Referring to FIG. 2, a Bluetooth HR subnet according to an example of the present invention, includes a supervisor 100, a candidate supervisor 110, and HR members 1~n. A reference numeral 120 indicates the HR member 1, 130 indicates the HR member n, and other HR members are omitted in the drawings.

Each HR member 1~n periodically reports a device capability record and a device neighbor record to the supervisor 100 (S200, S201, S202, S205, S206, S207). Each HR member retains the device capability which is the record of a battery available power capacity or support functions on the HR subnet. Upon connecting to the HR subnet, each HR member reports its device capability to the HR supervisor 100. Also, while a state as the HR member is maintained, the record is periodically reported to the supervisor 100. Accordingly, the supervisor 100 obtains a device capability list of all the members.

Meanwhile, the HR member has to scan a header of a received packet in order to maintain synchronization and monitor a slot token allocation. The header of the HR packet contains a source address of the device that transmits the packet. Accordingly, if a new source address is detected, the HR member records the transmitter device as the "device neighbor", and this means that the device neighbor is located within a radio range of the HR member. In receiving no packet from the device neighbor within a predetermined lifetime, the HR member deletes the record of the device neighbor. Accordingly, every HR member obtains the recent record of the entire device neighbor within its radio range.

Upon being reported the record on the device capability and the device neighbor from each HR member, the supervisor 100 generates device capability and device neighbor lists of all the members and periodically broadcasts them to every HR member (S210, S211, S212). Based on the lists, the supervisor 100 selects the "candidate supervisor 110" which is the most appropriate supervisor on the HR network. The device capability and device neighbor lists are periodically updated and broadcasted to every HR member. For example, the candidate supervisor 110 is the member having the best capability for the next supervisor. The best capability indicates the widest radio range or having the greatest number of the device neighbors. Since the supervisor 100 periodically broadcasts the device capability and device neighbor lists to every HR member, the entire HR member is aware of which HR member is a candidate supervisor 110.

Figure 3:
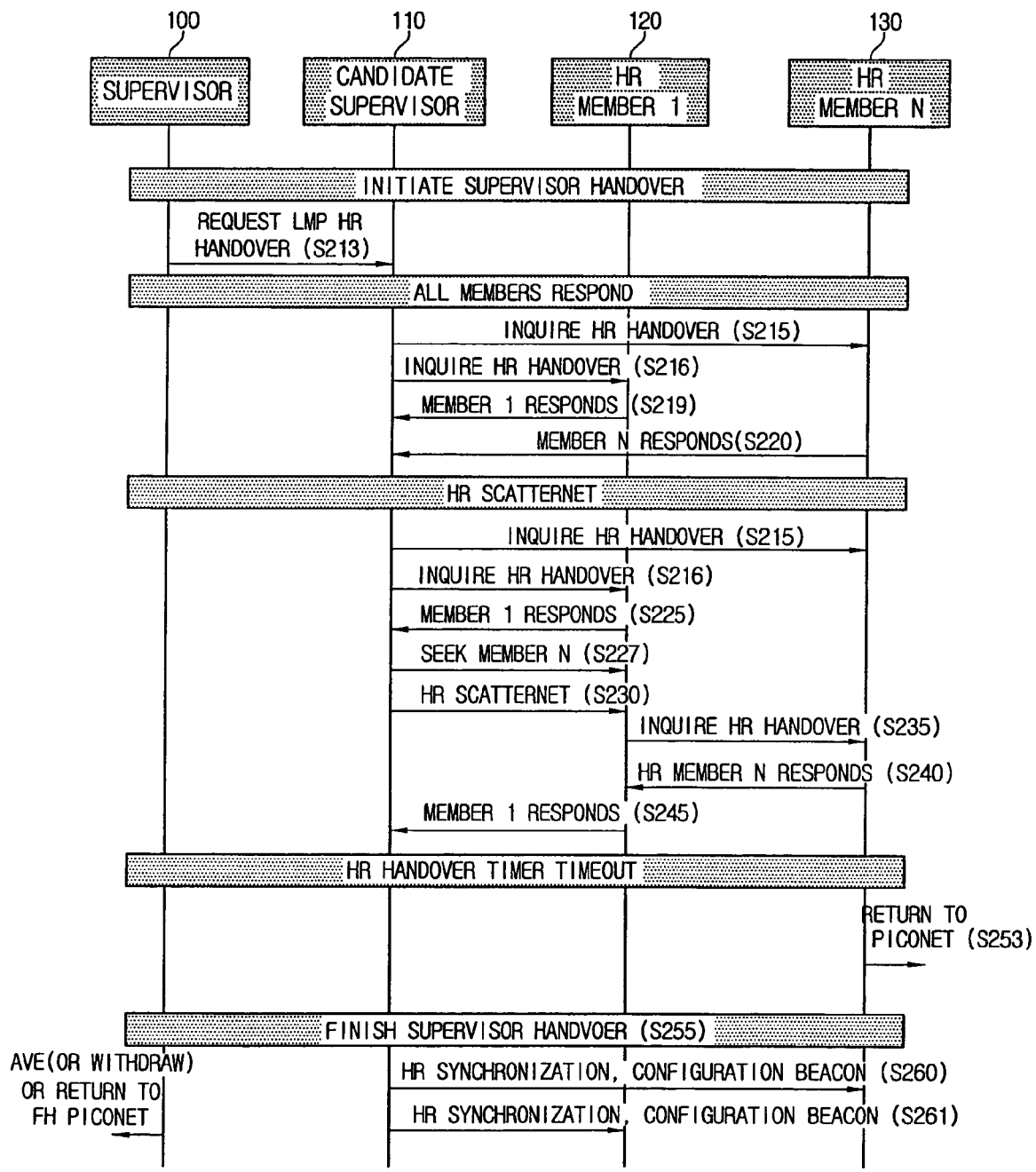
FIG. 3 is a message sequence chart depicting the case-by-case operations of all of the members in the HR subnet during the HR supervisor handover according to the present invention.

FIG. 3 is a message sequence chart (MSC) depicting case-by-case operations of the HR subnet members during the HR supervisor handover according to the present invention.

As described above, the supervisor handover is initiated when a synchronization time elapses or the supervisor 100 requests a Link Message Protocol (LMP) handover (S213).

According to the present invention, the candidate supervisor 110 is predetermined and is known to all of the HR members. Subsequently, in case of the supervisor handover, the candidate supervisor 110 broadcasts an inquiry message to every HR member (S215, 216).

Referring to FIG. 3, a situation in which every HR member responds to the inquiry message is described. Every HR member responds to the inquiry message which is broadcasted by the candidate supervisor 100 (S219, S220). Accordingly, it is proved that the candidate supervisor 110 can communicate with all of the members on the HR subnet. When receiving the responses, the candidate supervisor 110 operates as the supervisor, such as performing the HR synchronization or a configuration of a beacon (S260, S261), and the supervisor handover is finished.

Hereinafter, another situation is described in detail, in which a HR scatternet is configured due to the HR member 130 which does not respond to the inquiry message of the candidate supervisor. The HR member 120 responds to the inquiry message of the candidate supervisor 110 (S225). The HR member 130 does not respond. However, other members are not taken into account for the supervisor, since the candidate supervisor 110 has been selected as the most appropriate member for the supervisor, based on the device capability list and the device neighbor list. The candidate supervisor 110 transmits a seek message to ask the responding HR member 120 to seek missing HR member 130 and to configure a scatternet (S227, S230). On receiving the seek message, the HR member 120 broadcasts the inquiry message (S235). With respect to the inquiry message of the HR member 120, the missing HR member 130 responds (S240). Having found the missing HR member 130, the HR member 120 transmits the response for the seek message to the candidate supervisor 110 (S245). The HR member 120 responding to the seek message may be the device which records the missing HR member 130 as the device neighbor. The responding HR member 120 becomes a bridge node of the new HR scatternet. The bridge node joins two HR subnets by Time Division Duplex (TDD) method, and becomes the supervisor of the new HR subnet. Also, the bridge node becomes the master having the found HR member 130 as the slave on the FH piconet/scatternet corresponding to the new HR scatternet/subnet.

If the HR member, that is, the bridge node, cannot seek all the members which do not respond, a new bridge node may be designed as aforementioned and the above steps may be repeated. The supervisor handover is finished when all the responding members have performed the above steps.

Referring to FIG. 3, yet another situation is described in which a predetermined timeout elapses during the HR supervisor handover and the supervisor handover is finished. If it takes too much time in the supervisor handover, an effectiveness to maintain the HR subnet is deprived. To prevent this, a predetermined handover timeout is set. Accordingly, the members unconnected to the HR subnet or scatternet of the new supervisor within the timeout return to the FH piconet (S253). Consequently, in any case, if the timeout elapses, the supervisor handover is finished.

As aforementioned, after finishing the supervisor handover, the new supervisor synchronizes the networks, configures and broadcasts the beacon (S260).

According to the present invention, the supervisor receives the device capability record and the device neighbor record from every member, generates the device capability and device neighbor lists and broadcasts them to all the members, and therefore all the members become aware of the best supervisor candidate in advance. The lists are updated periodically. In the supervisor handover, the candidate supervisor broadcasts the inquiry message to every member, and configures the HR subnet for the responding members and the HR scatternet for the missing devices. Therefore, the more HR members can be connected to the HR subnet.

In addition, being selected prior to the supervisor handover, the candidate supervisor immediately broadcasts the inquiry message to all of the members, in the supervisor handover. Then, the candidate supervisor configures the HR subnet for the responding members and the HR scatternet for the missing members. Therefore, the time required for the supervisor handover is greatly reduced. Also, the timeout for the supervisor handover is set, and if the timeout elapses, the supervisor handover is finished. Consequently, the service interruption due to a delay of the supervisor handover is prevented.

While an exemplary embodiment of the present invention has been described, additional variations and modifications to the invention may occur to those skilled in the art once they learn of the basic inventive concepts. Therefore, it is intended that the appended claims shall be construed to include both the exemplary embodiment and all such variations and modifications as fall within the spirit and scope of the invention.

What is claimed is:

1. A supervisor handover method for electing a new supervisor on a first High Rate (HR) subnet of a Frequency Hopping (FH) piconet, including one supervisor and a plurality of members comprising the steps of:

selecting a candidate supervisor eligible to be the new supervisor among members of the first HR subnet prior to a supervisor handover;

broadcasting an inquiry message to all the members on the first HR subnet by the candidate supervisor when the supervisor handover is initiated; and electing the candidate supervisor as the new supervisor if all the members on the first HR subnet respond to the inquiry message, wherein the step of electing the new supervisor comprises the steps of:

transmitting a seek message to responding members in order to ask to seek for a missing HR member which does not respond to the inquiry message and to configure a second HR subnet if the missing member is on the first HR subject;

receiving, at the members, the seek message seeking the missing member, and configuring, as a supervisor, the second HR subnet including the missing member; and transmitting a response message established in response to the seek message, from the supervisor of the second HR subnet to the candidate supervisor.

2. The method of claim 1, wherein when a predetermined time elapses, the supervisor handover is finished and any member not included in any HR subnet returns to an original state as a member of the FH piconet.

3. The method of claim 1, wherein the step of selecting the candidate supervisor comprises the steps of:
   transmitting a device capability record and a device neighbor record from each member on the first HR subnet to the new supervisor;
   selecting the candidate supervisor as the new supervisor based on lists of the device capacity and the device neighbor of all the members on the first HR subnet; and
   broadcasting the lists and the selected candidate supervisor to all the members on the first HR subnet.

4. A supervisor handover method for electing a new supervisor on a first High Rate (HR) subnet of a Frequency Hopping (FH) piconet, including one supervisor and a plurality of members comprising the steps of:
   selecting a candidate supervisor eligible to be the new supervisor among members of the first HR subnet prior to a supervisor handover;
   broadcasting an inquiry message to all the members on the first HR subnet by the candidate supervisor when the supervisor handover is initiated; and
   electing the candidate supervisor as the new supervisor if all the members on the first HR subnet respond to the inquiry message,
   wherein the step of electing the new supervisor comprises the steps of:
      transmitting a seek message to responding members in order to ask to seek for a missing HR member which does not respond to the inquiry message and to configure a second HR subnet if the missing member is on the first HR subnet;
      receiving, at the members, the seek message seeking the missing member, and configuring, as a supervisor, the second HR subnet including the missing member; and
      transmitting a response message established in response to the seek message, from the supervisor of the second HR subnet to the candidate supervisor, and
      wherein when a predetermined time elapses, the supervisor handover is finished and any member not included in any HR subnet returns to an original state as a member of the FH piconet.

5. The method of claim 3, wherein the device capability record comprises at least one of a battery available power capacity and support functions on a HR subnet of a particular member, and the device neighbor record of the particular member comprises other members within a radio range of the particular member.

* * * * *